US005950182A

United States Patent [19]
Godbole et al.

[11] Patent Number: 5,950,182
[45] Date of Patent: *Sep. 7, 1999

[54] METHOD AND APPARATUS FOR AUTOMATICALLY CONSTRUCTING A DATA FLOW ARCHITECTURE

[75] Inventors: Devendra Bhalchandra Godbole, Austin; Steven Arthur O'Hara, Round Rock; Mary Anne Harding; Joshua Brennan Ellinger, both of Austin, all of Tex.

[73] Assignee: Pavilion Technologies, Inc., Austin, Tex.

[*] Notice: This patent is subject to a terminal disclaimer.

[21] Appl. No.: 09/015,984

[22] Filed: Jan. 30, 1998

Related U.S. Application Data

[63] Continuation of application No. 08/450,086, May 25, 1995, Pat. No. 5,768,475.

[51] Int. Cl.⁶ .................................................. G06F 17/00
[52] U.S. Cl. ................................ 706/45; 706/46; 706/47
[58] Field of Search ................................ 706/45, 46, 52, 706/47, 900, 913; 364/578; 707/503, 504

[56] References Cited

U.S. PATENT DOCUMENTS

| | | | |
|---|---|---|---|
| 4,398,249 | 8/1983 | Pardo et al. | 364/300 |
| 5,361,628 | 11/1994 | Marko et al. | 73/116 |
| 5,729,661 | 3/1998 | Keeler et al. | 706/16 |
| 5,734,908 | 3/1998 | Chan et al. | 395/709 |
| 5,768,475 | 6/1998 | Godbole et al. | 706/45 |

OTHER PUBLICATIONS

"An Extensible Digital Signal Processing Interpreter for Use with Computer–Assisted Instrumentation", Terry A. Hull and Stephen A. Dyer, IEEE Transactions on Instrumentation and Measurement, pp. 129–133, Feb. 1990, No. 1, New York, US.

"Gabriel—A Design Environment for DSP", Jeffrey C. Bier, Edwin E. Goei, Wai H. Ho, Philip D. Lapsley, Maureen P. O'Reilly, Gilbert C. Sih and Edward A. Lee, IEEE Micro, pp. 28–45, Oct. 1990, No. 5, Los Alamitos, CA, US.

"Virgo—Hierarchical DSP Code Generator Based on Vectorized Signal Flow Graph Description", Norichika Kumamoto, Keiji Aoko and Hiroaki Kunieda, IEICE Transactions on Fundamentals of Electronics, Communications and Computer Sciences, pp. 1004–1012, Aug. 1992, No. 8, Tokyo, JP.

"Graphical Programming Software", LabVIEW User Manual—National Instruments Corporation, pp. 1–1 –1–3, Sep. 1992.

Olender, K.M. et al., "Using Algebraic Specifications to Find Sequencing Defects," Fourth International Symposium on Software Reliabilty Engineering, pp. 226–232, Nov. 1993.

Olender et al. "Cecil: A Sequencing Constraint Language for Automatic Static Analysis Generation,"IEEE Transaction on Software Engineering, vol. 16, No. 3, pp. 268–80, Mar. 1993.

*Primary Examiner*—Tariq R. Hafiz
*Assistant Examiner*—Jason W. Rhodes
*Attorney, Agent, or Firm*—Gregory M. Howison

[57] ABSTRACT

An automatic data flow architecture builder is disclosed that is operable to take raw data which is stored in a raw data buffer (60) and transform it for storage in a transformed data buffer (78). A plurality of transform blocks (68), (70) and (72) are provided for this transform operation, these disposed in a predetermined data flow. When the user inputs a new transform to be disposed within the data flow of the transforms, rules are applied via a rule-base processing system (74) to apply a set of predetermined rules in a rule database (76) to the transform. These rules determine where the transform is to be inserted. This provides an automatic construction operation of a data flow architecture.

9 Claims, 6 Drawing Sheets

METHOD AND APPARATUS FOR AUTOMATICALLY CONSTRUCTING A DATA FLOW ARCHITECTURE

This application is a Continuation of application Ser. No. 08/450,086, filed May 25, 1995, now U.S. Pat. No. 5,768,475.

TECHNICAL FIELD OF THE INVENTION

The present invention pertains in general toward data flow architectures and, more particularly, to a technique for allowing a user to automatically construct a data flow architecture.

CROSS REFERENCE TO RELATED APPLICATION

This application is related to U.S. patent application Ser. No. 08/008,170, filed Jan. 25, 1993, which is a continuation-in-part of U.S. patent application Ser. No. 980,664, filed Nov. 24, 1992, and entitled "Method and Apparatus for Training and/or Testing a Neural Network on Missing and/or Incomplete Data" and related to co-pending U.S. patent application Ser. No. 08/008,218, filed concurrent herewith, and entitled "A Predictive Network with Learned Preprocessing Parameters" (Atty. Docket No. PAVI-21,557).

BACKGROUND OF THE INVENTION

When gathering variables to assemble a Dataset, some techniques have utilized a data preprocessor for transforming raw data into usable data. The typical preprocessing operation utilized a first data set referred to as the original or "raw" data values and the list of transforms that have been applied to the data. This therefore produces transformed variable values. These transformed variables can include variables that are unchanged from the raw values, variables whose raw values have been modified by the transforms, and newly created variables generated by the transforms.

A typical Dataset consists of three types of variables, raw variables, computed variables and independent variables. A raw variable in most cases, is a process variable that was read into the Dataset from a data file. If a transform is applied to the raw variable, it is still considered to be a raw variable, but it has both raw and transformed values. A computed variable is a variable that was created by applying a transform that generates a new variable, this typically being something like an equation. An independent variable is a variable created by applying a transform that generates new values without referencing any existing variables in the Dataset. Examples of an independent variable are the generating of constants, row numbers or random numbers. A transform is an expression that specifies some modifications or "transform" of variables in a Dataset. The output or result of the expression can either be stored in place of an existing variable, replacing its values, or can be stored as a new variable. One can apply more than one transform to the same variables. All transforms on the Dataset are kept in one ordered list. The typical syntax of a transform is:

(Outputs)=Function(Inputs)

The internal architecture of any existing spreadsheet software is either equation-based or sequential conventional language based.

In an equation-based system, each variable (or column, or even a cell in some cases in a spreadsheet) has its own formula or list of formulas. The system keeps track of which columns reference other columns, such that the calculations in the overall spreadsheet are done in the correct order. For example, A and B already exist in the spreadsheet, and a new column is created with a relationship X=A+B. Then, anytime one changes the value of either A or B, X is automatically recalculated. No matter what value is attributed to either A or B, X always retains the relationship A+B. The user never has to be concerned in which order formulas are applied, or with maintaining the relationships among variables. Many commercial spreadsheets utilize an equation-based architecture.

On the other hand, in a sequential conventional programming language based architecture there is one ordered list of formulas for the entire spreadsheet, and the formulas are calculated in the order in which they appear in the list. If one enters the formula X=A+B, it only means that "add the values that A and B have at that moment and then compute X". If a user then sequentially enters the formula and then changes the value of A or B, then X is not affected.

The equation based architecture has problems in that, if the variables have different date/time references and the user wishes to change these date/time references, this presents a problem. Since this type of architecture does not maintain one ordered list for all the transforms, transforms that merge the time base of the two variables (transforms which have implicit dependencies) are not possible to utilize with this type of architecture. Additionally, transforms that are required to change the date/time references for variables cannot be expressed as equations, since these type of transforms are fundamentally sequence-based operations.

Sequential conventional programming language based architecture is substantially more powerful than the equation-based architecture and it does not have any problem handling variables on different date/time references. However, this type of architecture does require considerable attention and understanding from the user to insure that the formulas are entered in the correct order to produce the desired results.

SUMMARY OF THE INVENTION

The present invention disclosed and claimed herein comprises a method and apparatus for automatically constructing a data flow architecture of data transforms. A raw data buffer is provided for storing raw data for processing thereof. The data is processed by arranging a sequence of transforms in a defined data flow architecture. The sequence of transforms is operable to transform the data in the raw buffer and store it in a transformed data buffer. A new transform is then input, which new transform is to be inserted into the sequence of transforms. A determination is made as to where in the sequence the new transform is to be inserted by applying predetermined insertion rules thereto in response to input of the new transform. Thereafter, the new transform is inserted in the determined location.

In another aspect of the present invention, the raw data is organized in row and columns of data. In one transform rule, the transform is analyzed to determine whether it has implicit dependencies on certain data in the sequence. This transform is then placed after the last transform that modifies any of the input data upon which it has dependencies. In another insertion rule, it is determined whether the transform creates new columns. If so, then a determination is made as to whether the transform modifies any of the raw data. If the transform does not create a new columns, then the transform is inserted after the last transform that modifies any of the data prior to insertion thereof. If the transform is determined to be one that creates or modifies new variables and adds a new column, this is disposed at the end of the transform sequence.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
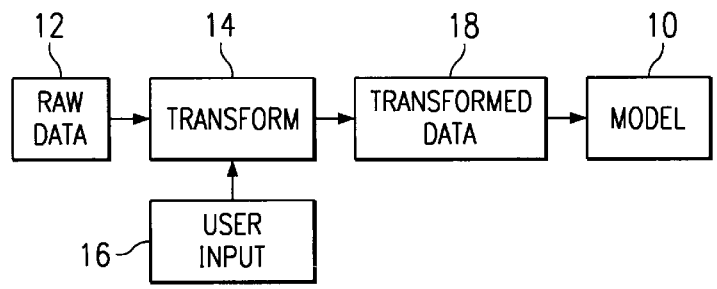
FIG. 1 illustrates a block diagram of the data flow architecture utilized in conjunction with a model.

Referring now to FIG. 1, there is illustrated a block diagram of the data flow architecture system of the present invention interfaced with a model 10. Data is input and stored in the form as raw data in a database 12, the raw data being any set of variables, and some of the variables can have missing or incomplete data and even be on different time references. In this form, this raw data is difficult to use. The raw data is transformed with a transform block 14 which is controlled via user input block 16. User input block 16 allows a user to control the manner in which raw data in the database 12 is transformed. Essentially, the user input 16 allows the user to determine the various transforms that are applied to the raw data. As will be described in much more detail herein below, it is the manner in which the transformed operations are organized that constitutes a major aspect of the present invention. Once transformed, the data is then stored in a database 18 which comprises the transformed data. This transformed data then can be utilized for input to the model 10, which model 10 utilizes this data during training operations for training of the model 10 and also during run time for some operations. The model 10 can be a non-linear model such as a neural network or any type of network that can be trained on a Dataset.

Figure 2:
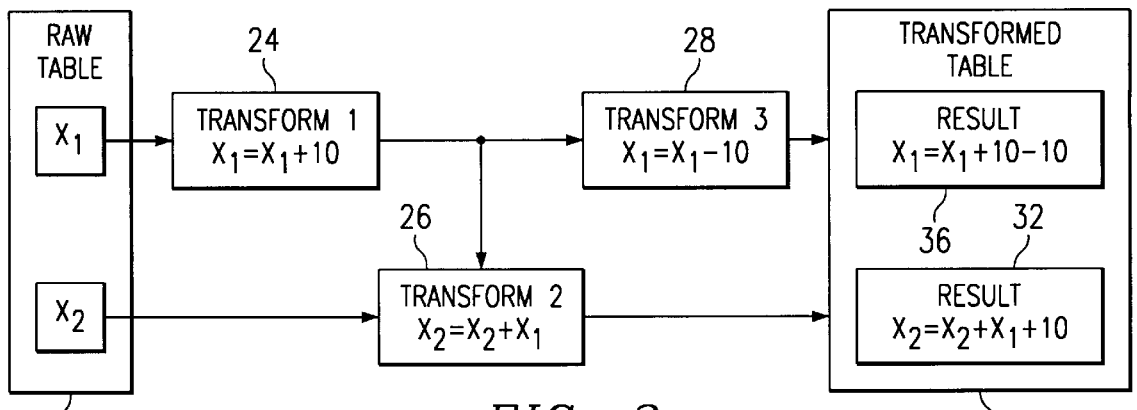
FIG. 2 illustrates a prior art conventional programming language based system.

Referring now to FIG. 2, there is illustrated a block diagram of a prior art conventional programming language. The data is contained in a database 22 which is comprised of two variables, a variable $X_1$ and a variable $X_2$. The first variable $X_1$ is input to a transform block 24 and has a transform applied to it in the form of:

$$X_1 = X_1 + 10$$

The output of this transform comprises the first transform and this is input to a second transform block 26. The second transform block 26 also receives the variable $X_2$ from the database 22. The second transform block 26 is operable to provide the following transform:

$$X_2 = X_2 + X_1$$

The output of the first transform block 24 is also input to a third transform block 28, which third transform block 28 is operable to perform the following transform on the variable $X_1$:

$$X_1 = X_1 - 10$$

The output result of transform block 26 is found in a transformed database 30 which is in the form of a table. The results of this transform are contained in a block 32 according to the following relationship:

$$X_2 = X_2 + X_1 + 10$$

The output of the third transform in transform block 28 is also contained in the transformed table in the transformed database 30. This is contained in a block 36. The result is as follows:

$$X_1 = X_1 + 10 - 10$$

It can be seen that the conventional programming language data flow treats each transform as a pipe fitting in a data stream. This is very important for run time implementation in that when the third transform in block 28 is performed, it does not modify the transform in transform block 26. If it did, then the subtraction of value "10" from $X_1$ would be reflected and the result of block 32 would be different by a value of "10".

Figure 3:
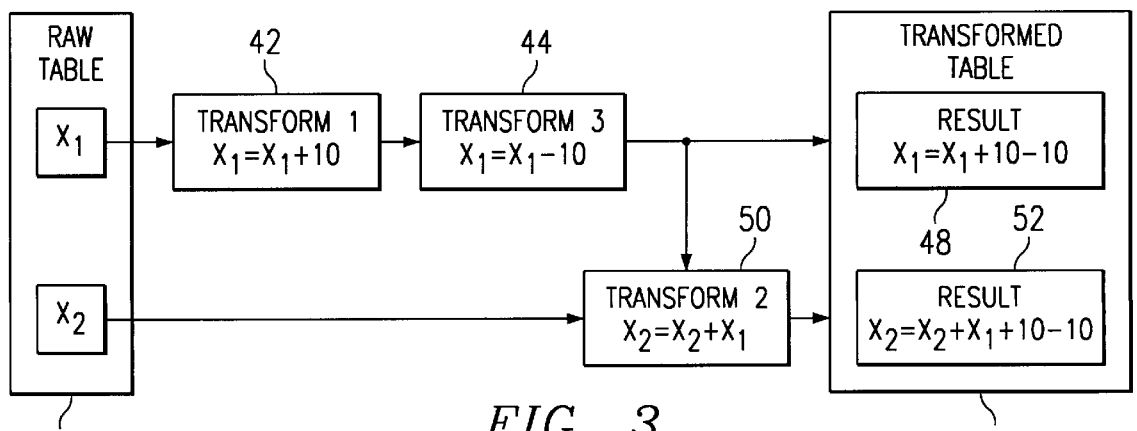
FIG. 3 illustrates a prior art equation-based system.

Referring now to FIG. 3, there is illustrated a block diagram of an equation-based architecture system. The raw data is contained in a database 40 which consists of a raw data table having the variables $X_1$ and $X_2$ similar to the database 22. The variable $X_1$ is input to a transform block 42 to perform the transform:

$$X_1 = X_1 + 10$$

This is then input to a transform block 44 to subtract the value of "10" from $X_1$ as follows:

$$X_1 = X_1 - 10$$

The output result is stored in a transformed database 46 in a block 48. The result of the two transforms in blocks 42 and 44 would provide the result in block 48 of:

$$X_1 = X_1 + 10 - 10$$

The variable $X_2$ is input to a transform block 50 that is separate from the transform blocks 42 and 44. The transform block 50 forms the following transform on the variable $X_2$, also utilizing the variable $X_1$:

$$X_2 = X_2 + X_1$$

However, in the equation-based architecture, the value of $X_1$ is the value after all transforms in transform block 42 and transform block 44 have been performed. Therefore, transform block 44 will effect the relationship on the output of the transform block 50. This is stored in a block 52 in the transformed database 46 and the transformed table associated therewith. This result will be:

$$X_2 = X_2 + X_1 + 10 - 10$$

It can be seen that the transform block 44 altered the result in block 52 as compared to the block 32 in the programming language architecture. Therefore, whenever a user desires to, for whatever reason, redefine the value of $X_1$ via another transform, it can effect other transforms that have dependencies thereon. Therefore, it is necessary that the entire equation-based data flow be evaluated for any change in the transforms.

Figure 4:
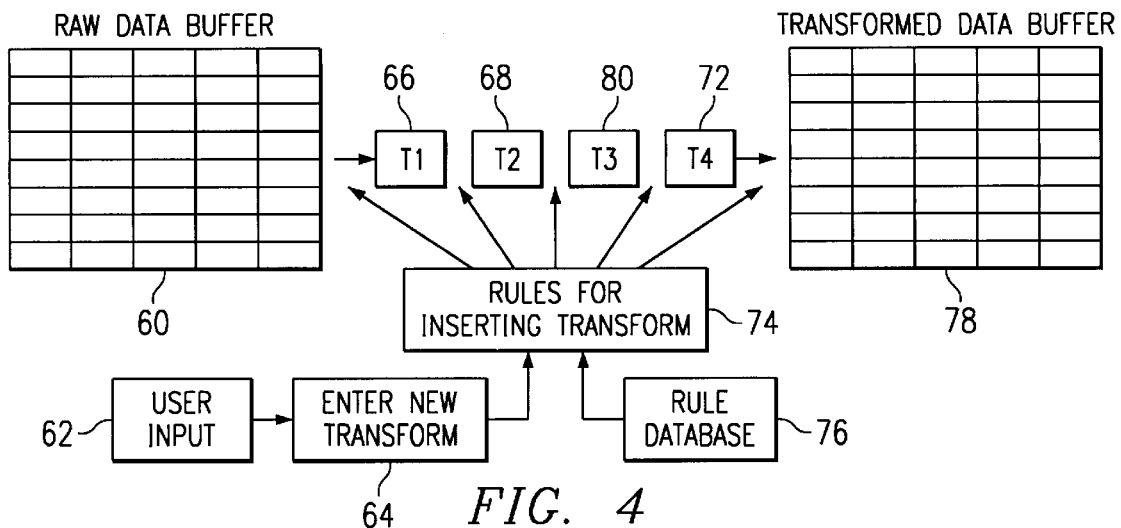
FIG. 4 illustrates a blocked diagram of the data flow architecture of the present invention.

Referring now to FIG. 4, there is illustrated a block diagram of the present invention. The raw data is contained in a raw data buffer in the form of a table 60. This data, as described above with respect to FIG. 1, is associated with database 12 and the raw data therein. Again, this data can have incomplete or missing data and can be on different date/time references. In this system, the user is provided a device to allow the user to determine how the data is to be transformed merely by inputting a transform into an input list. Although other systems such as the conventional programming language architecture can allow the user to assemble the appropriate data flow structure, the system of the present invention provides a way of quickly entering transforms and organizing them in the appropriate data flow architecture which preserves the equations. The user inputs the transform via the user input 62 and, as indicated by a block 64, a transform is provided to be "inserted" into the transform operation. As illustrated, there are four blocks 66, 68, 70 and 72 labeled T1, T2, T3, and T4, respectively, arranged in the transform sequence. When the new transform is entered, as indicated by the block 64, it is important to know where to insert it, i.e, between which of the blocks 66–72 or, even at the output of block 72 or before the input of block 66. In order to effect the location of the transform in the data flow, a rule based system 74 is provided that insets the transform in accordance with the plurality of predetermined rules which are stored in a rule database 76. This allows a transform to be inserted in the appropriate place and then the output of the entire transform string 66–72 and the new transform to be stored in a transform data buffer 78 in the form of a table. Although tables are utilized representing data in rows and columns, any type of organized or ordered database can be utilized.

The present invention is similar to a sequential conventional programming language as illustrated in FIG. 2 which emulates an equation-based system. When a new transform is entered, instead of being placed at the bottom of the list, it is automatically inserted in a position that retains the relationships that have already been specified. For example, if the formula X=A+B exists in the transform list and then subsequent transforms are entered by the user that change the value of A or the value of B, the new transforms are automatically inserted in the list above X=A+B, such that the value of X is forced to change. This is facilitated in the manner that is compatible with conventional programming language. For any particular transform, there may be a number of different "valid" positions in the data flow. However, although the transform list can be rearranged, it cannot be rearranged such that it stops emulating a equation-based system.

There are five different types of transforms. These are as follows:

Type I.—Transforms that modify that modify only one raw column.

Type II.—Transforms that create only one independent column and also transforms that modify only one independent column.

Type III.—Transforms that create only one date/time column and also transforms that modify only one computed date/time column.

Type IV.—Transforms which have implicit dependencies, or which are sequential in nature. Examples of these are time merge operations, and transforms that change the date/time references, etc. Additionally, this type of transfer may modify more than one raw date/time, and/or independent columns.

Type V.—Transforms that create or modify computed variables.

In order for a transform to be valid, it must be associated with a predetermined set of rules. Four sets of rules are as follows:

1) If the output variable(s) already exist in the data set, then the transform expression must use that same variable as at least one of its inputs. If any input to a transform is a computed variable, that transform's output cannot be a raw variable.

2) No Dataset variable can be utilized as an output after it has been used as an input to a different variable. i.e,

1) A=A+1

2) X=A+2

3) A=A+3

3) Variables with different date/time references cannot be combined in a single transform. The date/time reference of a raw or independent variable can be changed. Computed variables inherit their date/time reference from the associated input variable.

4) For the transforms which have multiple outputs, all the outputs have to be new columns.

Once it is determined that a transform is a valid transform, it then must have rules applied thereto.

Figure 5:
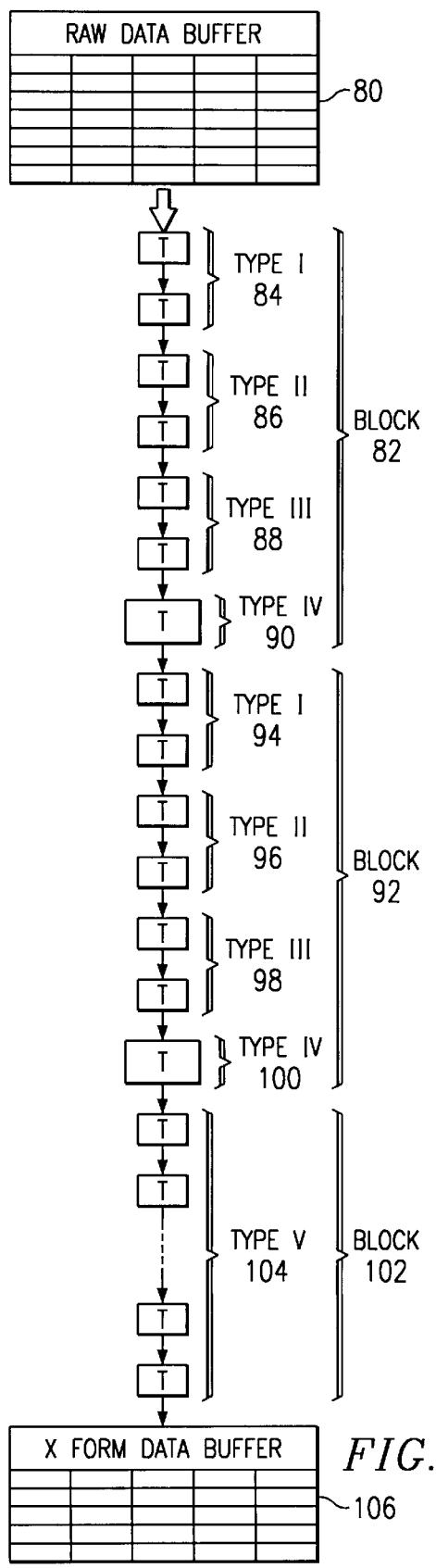
FIG. 5 illustrates a more detailed view of the data flow architecture of the present invention.

Referring now to FIG. 5, there is illustrated a block diagram of the parsing operation utilized to parse the transform lists. This is done in a sequential data flow structure. A raw data buffer 80 is provided that is operable to contain the raw data in columns and rows. As noted above, this raw data can have incomplete or missing data and be on different date/time references. A plurality of transforms are provided in a data flow architecture to represent the way in which the data is processed. The parsing operation is illustrated with three main Blocks. In the first Block, a block 82, there are provided three sets of transforms, a set 84, a set 86 and a set 88. The set 84 is comprised of Type I transforms, the set 86 is associated with Type II transforms and the set 88 is associated with Type III transforms. Additionally, there is a Type IV transform disposed at the end of the sets 8–86, this being a block 90. This block 90 is one that is associated with the transforms that have implicit dependencies. In the preferred embodiment these are time merge operations. Since a time merge has implicit dependencies, this provides a natural separator from one main Block to the next. Similarly, the second main Block, a block 92, is comprised of three sets 94, 96, and 98, associated with Type I transforms in set 94, Type II transforms in set 96 and Type III transforms in set 98. These are arranged in the sequence with set 98 following set 96 and set 96 following set 94. At the end of all the sets 94–98 is disposed a set 100 of Type IV transforms. Again, this is a time merge operation. That defines the end of the Block 92.

After the two main Blocks 82 and 92, there is disposed a main Block 102. This is comprised of a plurality of Type V transforms arranged in a sequence, which transforms, as described above, create or modify computed variables. The outputs are stored in a data buffer 106.

Figure 6:
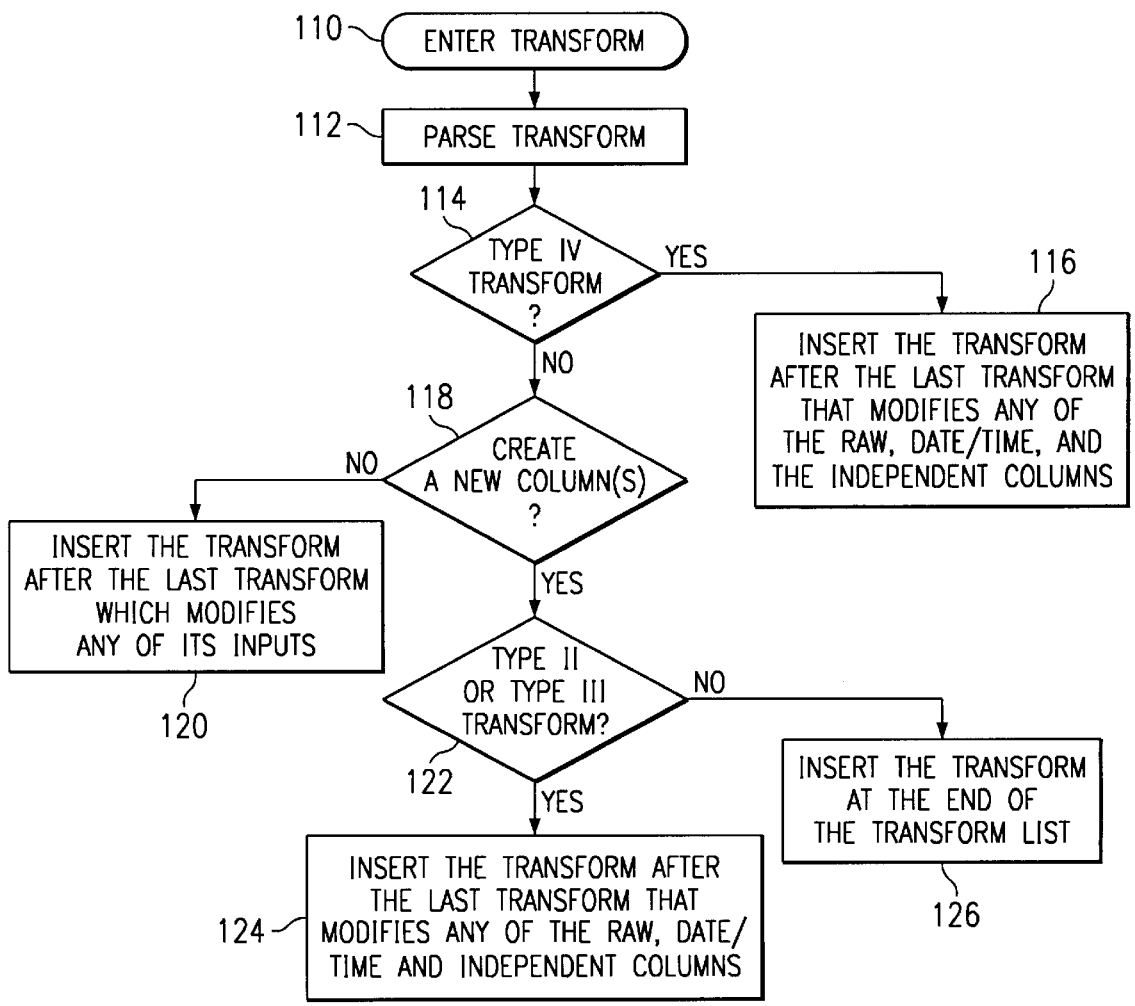
FIG. 6 illustrates a flow chart for the rule based decision tree

Referring now to FIG. 6, there is illustrated a flow chart depicting the rules for inserting a transform in the transform lists. The program is initiated at a block 110 and proceeds to a block 112 to a parse transform. The program then flows to a decision block 114 to determine if the transform is a Type IV transform, i.e., one that has implicit dependencies such as a time merge operation. If so, the program flows to a function block 116 to insert the transform after the last transform that modifies any of the raw data, the date/time columns, or the independent columns. This is a Type IV transform. This indicates the end of a block. However, if the transform is not a Type IV transform, the program flows from the decision block 114 along an "N" path to a decision block 118. Decision block 118 determines whether the transform creates a new column(s). If not, the program flows along a "N" path to a function block 120 to insert the transform after the last transform which modifies any of its inputs, i.e., merely adds it to the transform list. These are associated with transforms of Type I, Type II or Type III and Type IV.

If the transform creates a new column, the program will flow along the "Y" path from decision block to a decision block 122 to determine if this is a Type II or III transform. If it is an independent column or a date/time column, then the transform is inserted after the last transform that modifies any of the raw data, a date/time column, and the independent columns, this being either a Type II or Type III transform. However, if it is not a Type II or Type III transform, the program will flow along the "N" path to a function block 126 to insert the transform at the end of the transform lists, this being a Type V transform which is a transform that creates or modifies computed variables.

In order to correctly insert a transform, it is important to keep track of certain information regarding each variable. There are four types of indexes that are kept, a First Set index, a Last Set index, a Last Reference index and a Last Raw Reference index. The First Set index is a transform index that indicates where the variable was first modified or created within the data flow. The Last Set index is a transform index to determine where the variable was last modified. The Last Reference index is a transform index that determines where the variable was last utilized as an input. The Last Raw Reference index is a transform index that determines where the variable was last used as an input to the Type I, Type II or Type III transforms.

By way of example, consider the date/time column DTA associated with the data column A, the date/time column DTB associated with the data column B and the date/time column DTC associated with the data column C. These are the raw data columns in a given Dataset. Assume that the user enters the transforms in the following order:

1) A=A+1
2) B=B+1
3) X=$RANDOM
4) DTAB=$TimeMerge (DTA, DTB, X)
5) C=C+1
6) Y=A+B
7) A=A+2
8) B=B+2
9) DTABC=$TimeMerge (DTAB, DTC)
10) Z=Y+C By applying all the rules described above with reference to flow chart of FIG. 6, the transform list at each stage will be described as it is constructed and automatically arranged noting that the "asterisk" indicates the inserted transform. They will be set forth in ten steps.

1) After typing A=A+1 the transform list will be:
* 1) A=A+1

2) After typing B=B+1 the transform list will be:
* 1) B=B+1
2) A=A+1
3) After typing X=$RANDOM the transform list will be:
1) B=B+1
2) A=A+1
* 3) X=$RANDOM
4) After typing DTAB=$TimeMerge (DTA, DTB, X) the transform list will be:
1) B=B+1
2) A=A+1
3) X=$RANDOM
* 4) DTAB=$TimeMerge (DTA, DTB, X)
5) After typing C=C+1 the transform list will be:
* 1) C=C+1
2) B=B+1
3) A=A+1
4) X=$RANDOM
5) DTAB=$TimeMerge (DTA, DTB, X)
6) After tying Y=A+B the transform list will be:
1) C=C+1
2) B=B+1
3) A=A+1
4) X=$RANDOM
5) DTAB=$TimeMerge (DTA, DTB, X)
* 6) Y=A+B
7) After typing A=A+2 the transform list will be:
1) C=C+1
2) B=B+1
3) A=A+1
4) X=$RANDOM
5) DTAB=$TimeMerge (DTA, DTB, X)
* 6) A=A+2
7) Y=A+B
8) After typing B=B+2 the transform list will be:
1) C=C+1
2) B=B+1
3) A=A+1
4) X=$RANDOM
5) DTAB=$TimeMerge (DTA, DTB, X)
* 6) B=B+2
7) A=A+2
8) Y=A+B
9) After typing DTABC=$TimeMerge (DTAB, DTC) the transform list will be:
1) C=C+1
2) B=B+1
3) A=A+1
4) X=$RANDOM
5) DTAB=$TimeMerge (DTA, DTB, X)
6) B=B+2
7) A=A+2
* 8) DTABC=$TimeMerge (DTAB, DTC)
9) Y=A+B
10) After typing Z=Y+C the transform list will be:
1) C=C+1
2) B=B+1
3) A=A+1

4) X=$RANDOM
5) DTAB=$TimeMerge (DTA, DTB, X)
6) B=B+2
7) A=A+2
8) DTABC=$TimeMerge (DTAB, DTC)
9) Y=A+B
* 10) Z=Y+C As a further description of the above example, it can be seen that the first two inputs merely modify the inputs but do not create new columns. Therefore, these would be Type I transforms that modify only one raw column. Therefore, these constitute the first two steps in the sequence. The third step creates a new column that constitutes a Type II transform. This transform is defined by the block 124 of the flow chart of FIG. 6 in that this transform must be inserted after the last transform that modifies any of the raw data, the date/time columns and the independent columns. Therefore, it would be disposed after the first two steps, as indicated by step three.

The next step, step four, is a time merge operation. This is a Type IV transform and is required to be disposed after the last transform that modifies any of the raw data, the date/time columns and the independent columns. This would be disposed after the first three steps, the ones that modify the column B and the one that modifies the column A and the one which creates an independent column X. The next step is one that, again, modifies one of the data columns, the C data column. This is a Type I transform that requires it to be disposed after the last transform which modifies any of its inputs. Therefore, it will be disposed prior to the time merge operation and will be the first instruction, since nothing precedes it that will modify its inputs. In step six, this is an equation that constitutes a Type V transform, and therefore, it will be inserted at the end of the transform list. In step seven, this is a Type I transform and must be inserted after the last Type IV transform (since it modified A) and before the Type V transforms. This is also the case with respect to step eight which is also a Type I transform. In step nine, another Type IV transform is provided which defines the end of another block. This is inserted after the operations of step seven and eight. Step ten is another type five transform which is disposed in the last block, this being at the end of the list. Step ten illustrates all of the steps and how they have been automatically configured in accordance with the rules of the rule base system.

In the operation of this system, it can be seen that Type I transforms are straightforward transforms and are defined as being in a single block, wherein that single block has it boarder defined by the existence of the Type IV transform that, in the preferred embodiment, is a time merge operation. However, this generally is a sequential-based transform which, as noted above, is a transform that, when executed, modifies the data previous thereto and outputs a new transformed data table. If any modification of the transforms prior to this step were made, this would require the sequential transform to be again executed. Although the rules require any further Type I transforms or Type II transforms to be disposed after this Type IV transform, the user is provided with the option to insert a new transform in the middle of a block after the block has been created by the insertion of a Type IV transform. This is an exception and would have to be forced by the user, since the Type IV transform would again have to be executed.

Figure 7:
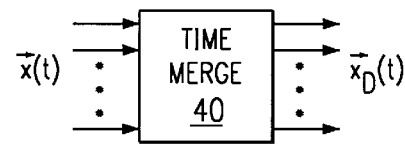
FIG. 7 illustrates a simplified block diagram of the time merging operation, which is part of the preprocessing operation.

Referring now to FIG. 7, there is illustrated a simplified block diagram of a time merge operation. All of the input data $x_D(t)$ is input to the time merge block 140 to provide time merge data $x_D'(t)$ on the output thereof Although not shown, the output target data y(t) is also processed through the time merge block 140 to generate time merged output data y'(t).

Figure 8A:
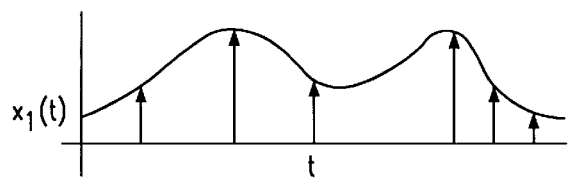
FIGS. 8a and 8b illustrate data blocks of the before and after time merging operation.
Figure 8B:
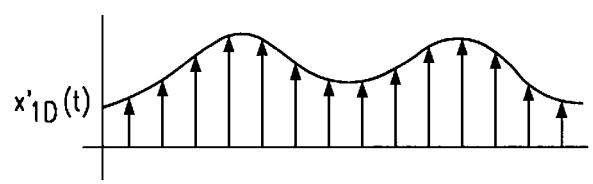

Referring now to FIGS. 8a and 8b, there are illustrated data blocks of one input data set $x_1(t)$ and the resulting time merged output $x_1'(t)$. It can be seen that the waveform associated with $x_1(t)$ has only a certain number, n, of sample points associated therewith. The time-merge operation is a transform that takes one or more columns of data, $x_i(t_j)$, such as that shown in FIG. 8a, with $n_i$ time samples at times $t_1'$. That is, the time-merge operation is a function, $\Omega$, that produces a new set of data $\{x'\}$ on a new time sale t' from the given set of data x(t) sampled at t.

$$\{\vec{x}';\ \vec{t}'\}\Omega\{\vec{x},\ \vec{t}\}$$

This function is done via a variety of conventional extrapolation, interpolation, or box-car algorithms and is represented as a C-language callable function as:

$$\text{return time-merge }(\vec{x}_1,\ \vec{x}_2\ \ldots\ \vec{x}_k,\ \vec{t}_1'\ \ldots\ \vec{x}_k',\ \vec{t}_1')$$

where $x_i$, $t_1$ are vectors of the old values and old times; $x_i'\ \ldots\ x_k'$ are vectors of the new values; and t' is the new time-scale vectors.

Figure 9C:
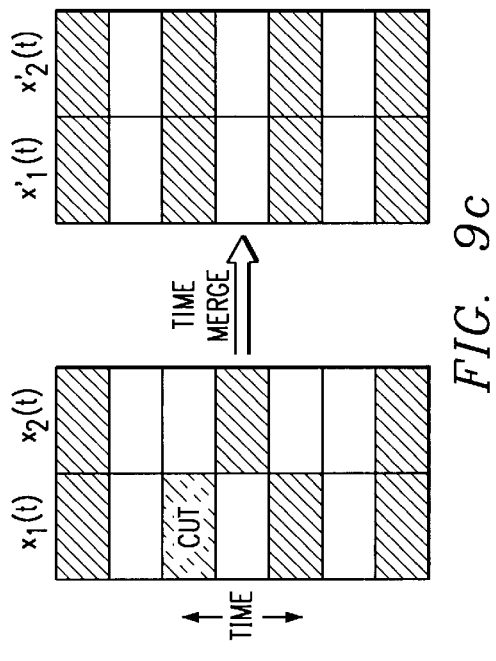
FIGS. 9a–9c illustrate a diagrammatic view of the time merging operation.
Figure 9A:
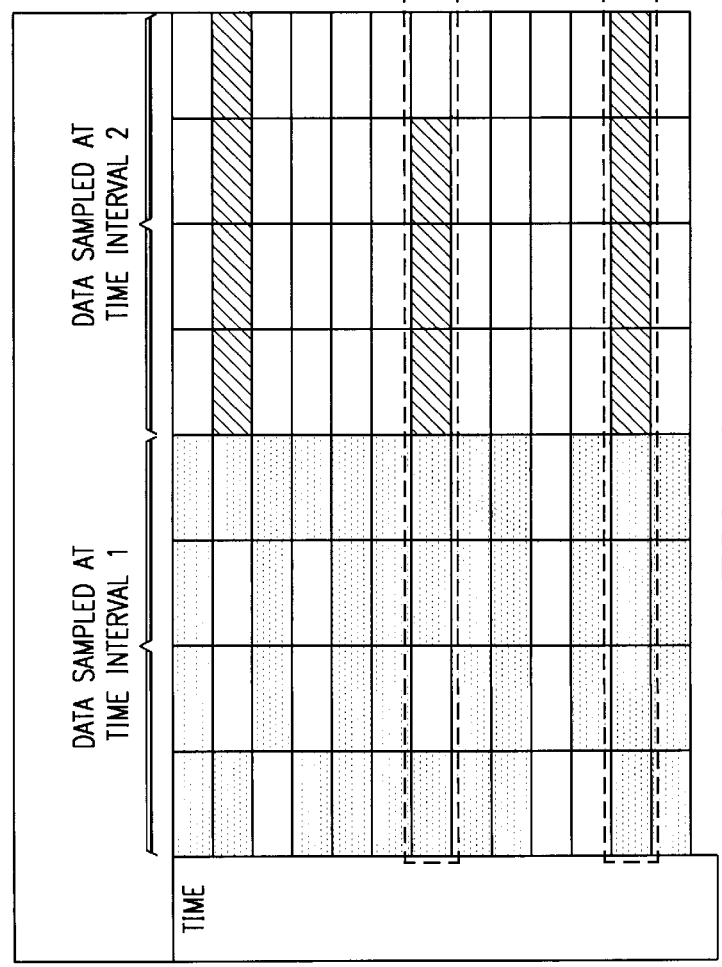

Referring now to FIG. 9a, there is illustrated a data table with bad, missing, or incomplete data. The data table consists of data with time disposed along a vertical scale and the samples disposed along a horizontal scale. Each sample comprises many different pieces of data with two data intervals illustrated. It can be seen that when the data is examined for both the data sampled at the time interval "1" and the data sampled at the time interval "2", that some portions of the data result in incomplete patterns. This is illustrated by a dotted line 163, where it can be seen that some data is missing in the data sampled at time interval "1" and some is missing in time interval "2". A complete neural network pattern is illustrated box 164, where all the data is complete. Of interest is the time difference between the data sampled at time interval "1" and the data sampled at time interval "2". In time interval "1", the data is essentially present for all steps in time, whereas data sampled at time interval "2" is only sampled periodically relative to data sampled at time interval "1". As such, a data reconciliation procedure is implemented that fills in the missing data and also reconciles between the time samples in time interval "2" such that the data is complete for all time samples for both time interval "1" and time interval "2".

The neural network models that are utilized for time-series prediction and control require that the time-interval between successive training patterns be constant. Since the data that comes in from real-world systems is not always on the same time scale, it is desirable to time-merge the data before it can be used for training or running the neural network model. To achieve this time-merge operation, it may be necessary to extrapolate, interpolate, average or compress the data in each column over each time-region so as to give an input value x'(t) that is on the appropriate time-scale. All of these are referred to as "data reconciliation". The reconciliation algorithm utilized may include linear estimates, spline-fit, boxcar algorithms, etc. If the data is sampled too frequently in the time-interval, it will be necessary to smooth or average the data to get a sample on the desired time scale. This can be done by window averaging techniques, sparse-sample techniques or spline techniques.

In general, x'(t) is a function of all of the raw values x(t) given at present and past times up to some maximum past time, Xmax. That is, $$\vec{x}'(t) \, f(x_1(t_N), x_2(t_N), \ldots x_n(t_N); x_1(t_{N-1}), x_1(t_{N-2}) \ldots x_1(t_{N-1});$$
$$x_1(t_1), x_2(t_1) \ldots x_n(t_1))$$

where some of the values of $x_i(t_j)$ may be missing or bad.

This method of finding x'(t) using past values is strictly extrapolation. Since the system only has past values available during run time mode, the values must be reconciled. The simplest method of doing this is to take the next extrapolated value $x'_i(t)=x_i(t_N)$; that is, take the last value that was reported. More elaborate extrapolation algorithms may use past values $x_i(t-\tau_{ij})$, $j\epsilon t(o, \ldots i_{max})$. For example, linear extrapolation would use:

$$x_i(t) = x_i(t_{N-1}) + \left[ \frac{x_i(t_N) - x_i(t_{N-1})}{t_N - t_{N-1}} \right] t; \, t > t_N$$

Polynomial, spline-fit or neural-network extrapolation techniques use Equation 3. (See eg. W. H. Press, "Numerical Recipes", Cambridge University Press (1986), pp. 77–101) Training of the neural net would actually use interpolated values, i.e., Equation 4, wherein the case of interpolation $t_N>t$.

Figure 9B:
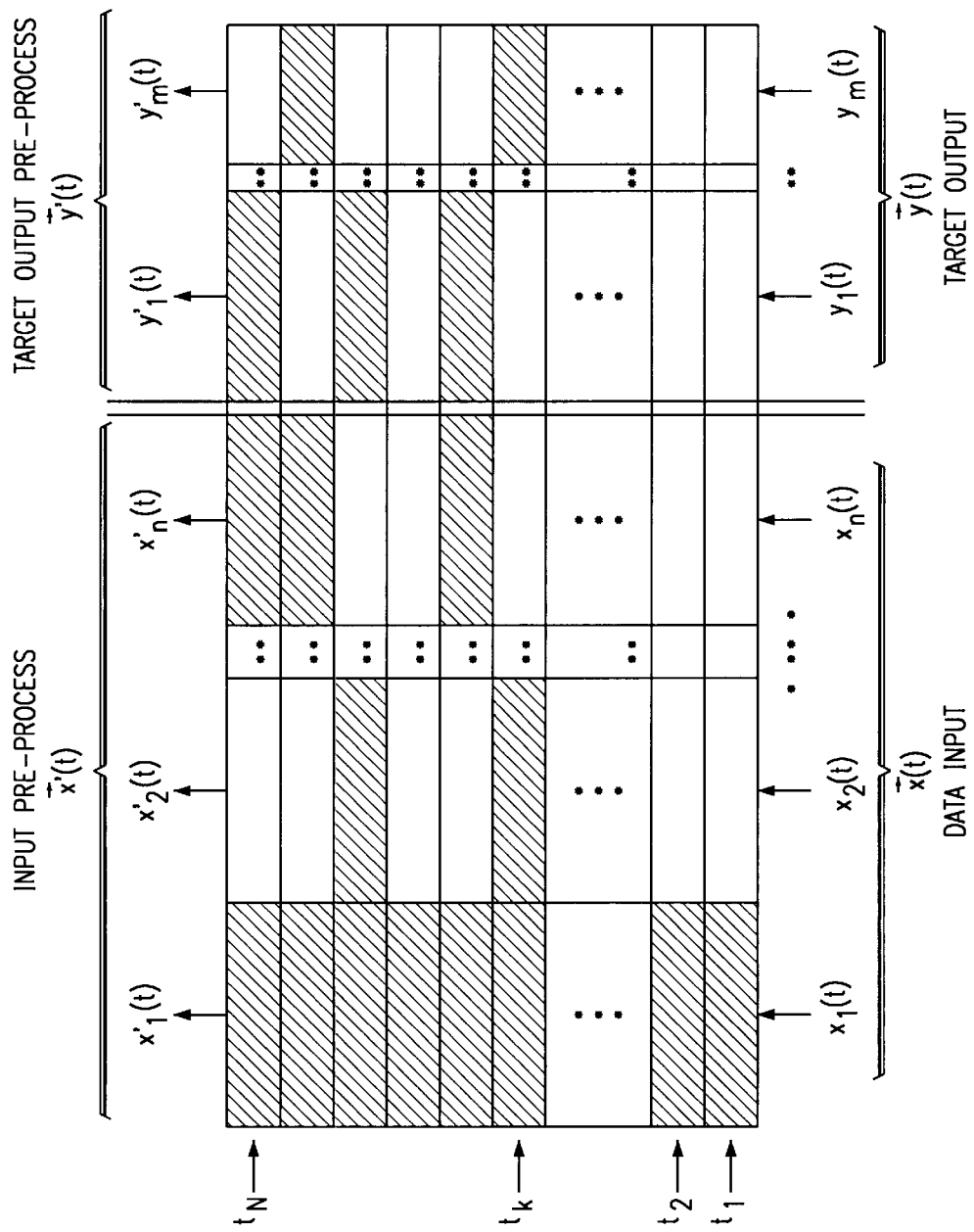

Referring now to FIG. 9b, there is illustrated an input data pattern and target output data pattern illustrating the pre-process operation for both preprocessing input data to provide time merged output data and also pre-processing the target output data to provide pre-processed target output data for training purposes. The data input x(t) is comprised of a vector with many inputs, $x_1(t), x_2(t), \ldots x_n(t)$, each of which can be on a different time scale. It is desirable that the output x'(t) be extrapolated or interpolated to insure that all data is present on a single time scale. For example, if the data at $x_1(t)$ were on a time scale of one sample every second, a sample represented by the time $t_k$, and the output time scale were desired to be the same, this would require time merging the rest of the data to that time scale. It can be seen that the data $x_2(t)$ occurs approximately once every three seconds, it also being noted that this may be asynchronous data, although it is illustrated as being synchronized. The data buffer in FIG. 8b is illustrated in actual time. The reconciliation could be as simple as holding the last value of the input $x_2(t)$ until a new value is input thereto, and then discarding the old value. In this manner, an output will always exist. This would also be the case for missing data. However, a reconciliation routine as described above could also be utilized to insure that data is always on the output for each time slice of the vector x'(t). This also is the case with respect to the target output which is preprocessed to provide the preprocessed target output y'(t).

Referring now to FIG. 9c, there is illustrated the preferred embodiment of performing the time merge. Illustrated are two formatted tables, one for two sets of data $x_1(t)$ and $x_2(t)$. This is set up such that the data set for $x_1(t)$ is illustrated as being on one time scale and the data $x_2(t)$ is on a different time scale. Additionally, one value of the data set $x_1(t)$ is illustrated as being bad, which piece of bad data is "cut" from the data set, as will be described hereinbelow. The operation in the preprocessing mode fills in this bad data and then time merges it. In this example, the time scale for $x_1(t)$ is utilized as a time scale for the time merge data such that the time merge data $x_1'(t)$ is on the same time scale with the "cut" value filled in as a result of the preprocessing operation and the data set $x_2(t)$ is processed in accordance with one of the time merged algorithms to provide data for $x_2'(t)$ and on the same time scale as the data $x_1'(t)$. These algorithms will be described in more detail hereinbelow.

Figure 10:
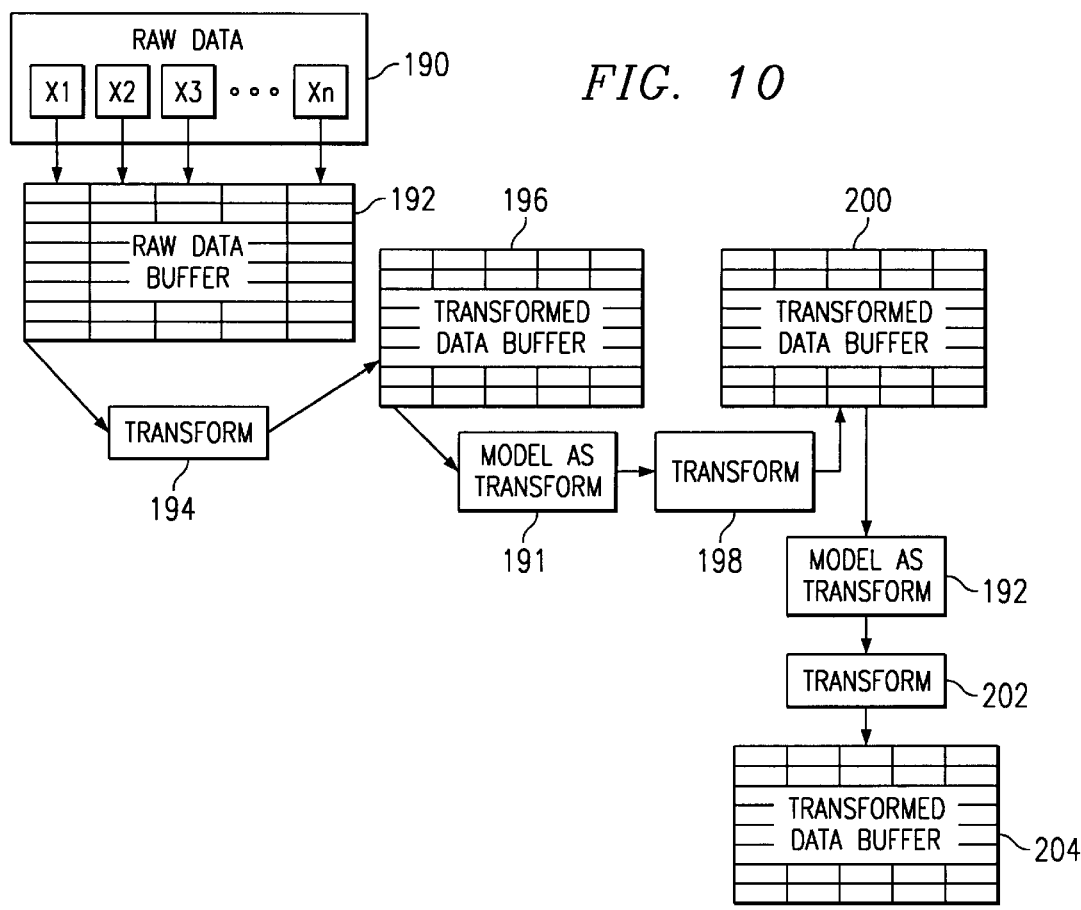
FIG. 10 illustrates a data flow architecture that utilizes models as transforms.

Referring now to FIG. 10, there is illustrated a data flow architecture utilizing the models as transforms. In this data flow architecture, raw data noted by a block 190 is provided, which data is in the form of $X_1, X_2, X_3 \ldots X_N$. This is input to a raw data buffer 192 in the form of a table. The raw data, as described above, is processed via a transform list as follows:

1) T1
2) T2
3) runModel (M1, "runpredictions")
4) y=log(M1_out1)
5) M2input=f(y)
6) runModel(M2)
7) ave=out_M1+outM2

The raw data is first transformed by step 1 and 2 which comprises two general transforms, this noted by a block 194. This presents a first intermediate transform data buffer 196. The data in the transform data buffer 196 is then provided as inputs to a model M1. This model essentially operates as a transform. It can be any type of linear or nonlinear model, such as a neural network. The output of this model M1 is input to a transform block 198 that performs the transform steps 4 and 5 to create a Type V transform. This is then stored in a transformed data buffer table 200 and this then input into a second model M2 which is also utilized as a transform. The output of the M2 model is the output of step 6 and this is input to another transform block 202 which performs step 7 which is actually a transform that averages the output of model M1 and model M2. This is stored in the final transform data buffer 204.

Figure 11:
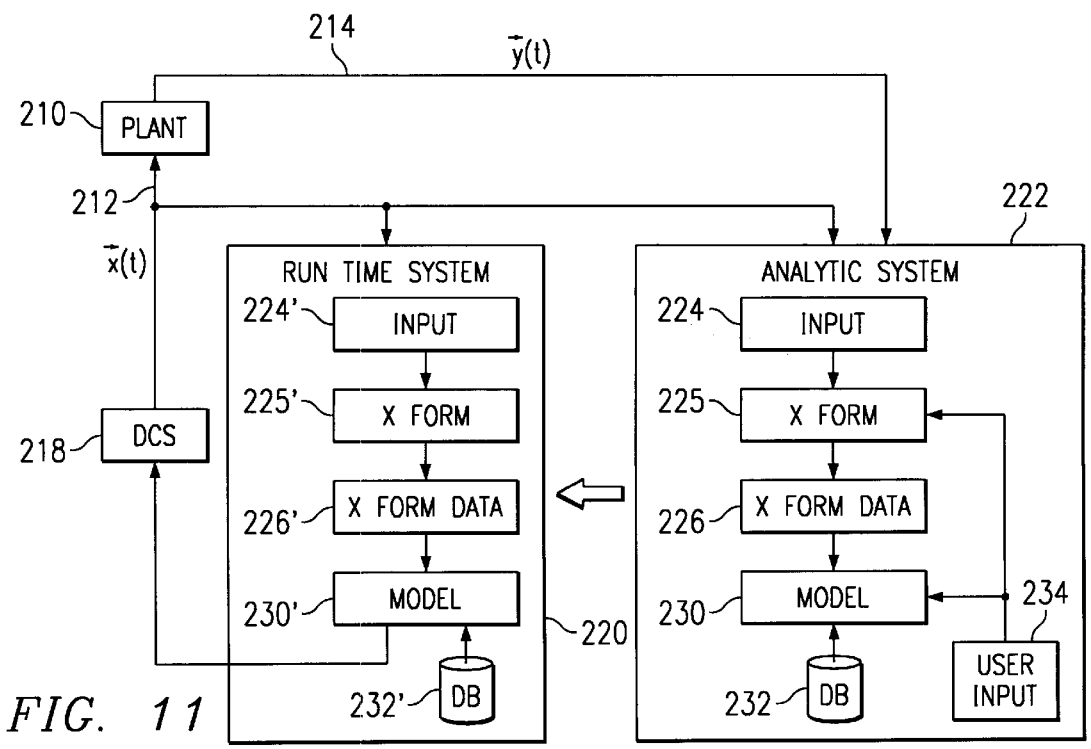
FIG. 11 illustrates a block diagram of an example of one application of the data flow architecture of the present invention.

Referring now to FIG. 11, there is illustrated a block diagram of an application of the system of the present invention. A plant 210 is provided which has an input 212 and an output 214, the output being a vector output y(t) and an input vector x(t). The input values to the plant 210 are provided by a distributed control system (DCS) 218. There are provided two systems that utilize the present invention, a run time system 220 and an analytic system 222. The analytic system 222 was described hereinabove with respect to the use of the transform method and the data flow architecture. In general, the plant 210 is run to obtain input data and output data to form a training database. This comprises an input 224. This is passed through transforms 225 to provide a transform data output 226. This data is then utilized to form a model 230. This model 230 is, in the preferred embodiment, a neural network which utilizes a generally conventional backpropagation structure. The model 230 is built with parameters that are stored in a database 232. A user input 234 is provided for allowing the user to insert transforms and, in general, modify the model in an analytic mode.

In the run time mode, the model 230 that was generated in the analytic system 222 is transferred over to the run time system 220. As such, the run time system also includes an input 224' a transform block 225' and a transform data buffer 226'. A model 230' is provided which is essential identical to the model 230 in the analytical system 222. This also interfaces with a database 232'. The model 230' is operable to output predicted inputs and outputs for input to the DCS 218 in a control configuration. This, again, is conventional when the model is configured.

The analytic system 222 is utilized to determine the architecture and the parameters of the model 230 which can then be transferred over to the model 230'. Once implemented, the model 230' then runs the system in a run time mode. During this run time mode, the analytic system 222 can be utilized to determine how the model can be varied to improve performance. In the preferred embodiment, the system must be shut down before the model parameters on the model 230' in the database 232' are updated. However, this can be done in a run time mode, wherein parameters of the model 230' are updated from the model 230.

In summary, there has been provided a data flow architecture that provides the user the ability to automatically build a data flow architecture. The user is allowed to insert transforms into a transform list, and then the system will apply rules to these transforms to determine where in the data flow they are to be inserted. Once determined, these will be entered in the appropriate location and the data flow architecture automatically constructed.

Although the preferred embodiment has been described in detail, it should be understood that various changes, substitutions and alterations can be made therein without departing from the spirit and scope of the invention as defined by the appended claims.

What is claimed is:

1. A computer-readable medium on which is stored a computer program for controlling a computer to automatically construct a data flow architecture of data transforms, said computer-readable medium comprising:

means for storing raw data in a raw data buffer;

means for forming a sequence of transforms for transforming the data in the raw data buffer, the sequence arranged to define a data flow architecture;

means for storing the output of the sequence of transforms in a transform data buffer;

means for inputting by a user a new transform that will modify the sequence of transforms stored in the transform data buffer;

means for determining where in the sequence of transforms in the transform data buffer the new transform is to be inserted by applying predetermined insertion rules thereto in response to input of the new transform;

means for inserting the new transform in the determined location within the sequence of transforms as a modified sequence of transforms; and means for controlling the computer with the modified sequence of transforms.

2. The computer-readable medium of claim 1, and further comprising means for determining if the new transform is a valid transform in accordance with the predetermined criteria and, if it is determined that the new transform is an invalid transform, inhibiting said means for determining by applying predetermined insertion rules.

3. The computer-readable medium of claim 1, where said means for storing raw data in a raw data buffer is operable to store the raw data in the form of data in a table that is disposed in columns and rows.

4. The computer-readable medium of claim 3, wherein said means for determining by applying predetermined insertion rules is operable for determining if the transform has an implicit dependency associated therewith upon transform operations that were input prior to input of the new transform, and said means for inserting is operable such that such transform is inserted after prior transforms on which there is an implicit dependency.

5. The computer-readable medium of claim 3, wherein said means for determining by applying predetermined insertion rules utilizes an insertion rule that determines if the transform is one that modifies a single column of data which results in operation of said means for inserting performing an insertion of the transform after the last transform which modifies any of its inputs.

6. The computer-readable medium of claim 3, wherein said means for determining by applying predetermined insertion rules is operable to utilize an insertion rule that determines if the transform is operable to modify one of the columns of data and, if so, said means for inserting is operable for inserting the new transform after the last transform that modifies any of the columns.

7. The computer-readable medium of claim 3, wherein said means for determining by applying predetermined insertion rules is operable for determining if the transform creates or modifies computed variables and, if so, said means for inserting is operable for inserting the transform at the end of the transform sequence.

8. The computer-readable medium of claim 3, wherein said means for determining by applying predetermined insertion rules is operable for determining if the transform is sequential in nature, and said means for inserting is operable such that such transform is inserted after prior transforms upon which the sequential nature depends.

9. The computer-readable medium of claim 1, wherein said means for inserting operates to insert transforms in a run time mode.

\* \* \* \* \*